(12) United States Patent
Specht et al.

(10) Patent No.: US 6,937,774 B1
(45) Date of Patent: Aug. 30, 2005

(54) APPARATUS AND METHOD FOR EFFICIENTLY INCREASING THE SPATIAL RESOLUTION OF IMAGES

(75) Inventors: Donald Francis Specht, Los Altos, CA (US); Peter Stanek, San Rafael, CA (US); Robert Marc Drake, Sunnyvale, CA (US)

(73) Assignee: Lockheed Martin Corporation, Bethesday, MD (US)

( * ) Notice: Subject to any disclaimer, the term of this patent is extended or adjusted under 35 U.S.C. 154(b) by 577 days.

(21) Appl. No.: 09/694,782

(22) Filed: Oct. 24, 2000

(51) Int. Cl.$^7$ .............................. G06K 9/40; G06K 9/32; H04N 5/235; H04N 5/238
(52) U.S. Cl. ........................ 382/254; 382/263; 382/264; 382/299; 348/362; 348/364; 348/365
(58) Field of Search ................................. 382/251, 253, 382/260–265, 274, 275, 299, 300

(56) References Cited

U.S. PATENT DOCUMENTS

| | | | | |
|---|---|---|---|---|
| 4,597,005 A | * | 6/1986 | Baleshta et al. ............ | 348/472 |
| 5,226,094 A | * | 7/1993 | Eschbach .................... | 382/252 |
| 5,450,502 A | * | 9/1995 | Eschbach et al. ........... | 382/169 |
| 5,717,789 A | * | 2/1998 | Anderson et al. ........... | 382/254 |
| 5,835,637 A | | 11/1998 | Houchin et al. | |
| 5,930,405 A | * | 7/1999 | Chida ......................... | 382/284 |

(Continued)

OTHER PUBLICATIONS

Inque et al., Adaptive Image Sharpening Method Using Edge Sharpness, IEICE Transactions on Information and Systems, Institute of Electronics Information and Comm. Eng. Tokyo, JP, vol. E76–D, No. 10, Oct. 1993, pp. 1174–1180.

Schavemaker et al., Image Sharpening by morphological filtering, Pattern Recognition, Pergamon Press Inc., Elmsford, N.Y., US, vol. 33, No. 6, Jun. 3, 2000, pp. 997–1012.
Sylvia S. Shen, John E. Lindgren & Paul M. Payton, SPIE–The International Society for Optical Engineering, Reprinted from Neural and Stochastic Methods in Image and Signal Processing III, Panchromatic Band Sharpening of Multispectral Image Data to Improve Machine Exploitation Accuracy, SPIE vol. 2304, Jul. 28–29, 1994, pp. 124–131.

(Continued)

*Primary Examiner*—Samir Ahmed
*Assistant Examiner*—Brian Le
(74) *Attorney, Agent, or Firm*—McDermott Will & Emery LLP

(57) ABSTRACT

A method increases the spatial resolution of a source image based on an auxiliary, co-registered image of a higher spatial resolution. Each of the source and auxiliary images includes a plurality of pixels with corresponding spectral intensities and the method includes reducing, identifying, deriving, subdividing and modifying steps. Multiple auxiliary images can be used with the method.

In the reducing step, a spatial resolution of the auxiliary image is reduced to a common resolution with the source image. Then in the identifying step, corresponding groups of pixels at the common resolution in the source and auxiliary images are identified. Then in the deriving step, a mapping function is derived which relates the rate of change of intensity of each group in the auxiliary image and the corresponding rate of change of intensity in the corresponding group in the source image to the intensity vector. This map can be conditioned on any number of auxiliary image planes.

In the subdividing step, each source pixel is subdivided. Then in the modifying step, the spectral intensity of each subdivided source pixel is modifying based on the map and the local intensity variations of the auxiliary image. This results in increasing the resolution of the source image.

15 Claims, 7 Drawing Sheets

U.S. PATENT DOCUMENTS

| | | | | |
|---|---|---|---|---|
| 6,236,763 B1 | * | 5/2001 | Wong et al. | 382/261 |
| 6,317,525 B1 | * | 11/2001 | Aleksic et al. | 382/299 |
| 6,438,273 B1 | * | 8/2002 | Loce et al. | 382/296 |
| 6,456,324 B1 | * | 9/2002 | Yamada et al. | 348/219.1 |
| 6,496,608 B1 | * | 12/2002 | Chui | 382/300 |
| 6,507,668 B1 | * | 1/2003 | Park | 382/169 |
| 6,519,366 B1 | * | 2/2003 | Kaburagi | 382/251 |
| 6,522,284 B2 | * | 2/2003 | Miceli et al. | 342/22 |
| 6,567,119 B1 | * | 5/2003 | Parulski et al. | 348/207.2 |
| 2002/0126209 A1 | * | 9/2002 | Yamada et al. | 348/219 |

OTHER PUBLICATIONS

John E. Lindgren & Steven Kilston, A Projective Pan Sharpening Algorithm, Lockheed Martin Missiles & Space, Space Imaging, Incorporated, SPIE 1996.

A. Evan Iverson & James R. Lersch, Adaptive Image Sharpening using Multiresolution Representations, SPIE vol. 2231, Apr. 5, 1994, pp. 1–12.

* cited by examiner

SOURCE IMAGE                    AUXILIARY IMAGE

APPARATUS AND METHOD FOR EFFICIENTLY INCREASING THE SPATIAL RESOLUTION OF IMAGES

FIELD OF THE INVENTION

The present invention relates generally to image processing and more particularly to techniques for enhancing the spatial sharpness or resolution of an image using a higher resolution, substantially co-registered image.

BACKGROUND OF THE INVENTION

Image processing refers to any and all activities that acquire, manipulate, store and display images. Many specific useful applications arise in, for example, photography, medical imaging and satellite imaging.

Images are typically acquired with a camera or scanner that exposes sensors or film that register a single spectral band or multiple spectral bands of incident radiation from a scene to be imaged. Monochrome images are examples of images acquired using a single spectral band. Color images are examples of images acquired using several spectral bands that represent blue, green, and red signals. In general, multi-spectral images contain more useful information than single spectral band images. However, sensors or film used in cameras or scanners that acquire multi-spectral images are more complex and expensive than sensors or film used to acquire single spectral band images. The cost of cameras and sensors to acquire high quality multi-spectral images at high resolutions may be extremely expensive.

The performance of an image processing system can be measured in many ways. One measure is "resolution," or the ability to distinguish different scene objects or materials in the processed image. "High resolution" means the processed image shows different objects that are closely spaced in the scene. Such "high resolution" is more properly termed "high spatial resolution." The term "high spectral resolution" refers to the system's ability to distinguish some elements that are closely related in electromagnetic wavelength.

Because of the high cost of acquiring high spatial resolution, multi-spectral images directly, it would be desirable to acquire multi-spectral images using lower resolution cameras and to increase the resolution of the acquired images in a less expensive way.

One conventional technique for increasing the spatial resolution of a low resolution image is described in a paper entitled "Adaptive Image Sharpening using Multiresolution Representations" by A. Evan Iverson and James R. Lersch, SPIE Volume 2231, 5 Apr. 1994. This technique uses a high-resolution image acquired from a single band sensor to enhance the resolution of a co-registered, low resolution, multi-spectral band image. Specifically, the technique disclosed therein relies upon computationally demanding and complex steps of creating Gaussian and Laplacian pyramids to find relationships between the high-resolution and low resolution images that are then used to map pixels from the high resolution image to the low resolution image, creating a synthetic image with improved spatial resolution.

It is desirable to provide a method of increasing the spatial resolution of a low-resolution, multi-spectral image that is fast and less computationally demanding than the Iverson and Lersch technique. It is further desirable to provide a method of increasing the spatial resolution of a low-resolution, multi-spectral image using at least one high resolution image in a way that closely approximates the spectral content of interest from the low resolution image.

Another prior art technique is the Projective Pan Sharpening Algorithm (published by John Lindgren and Steven Kilston as paper #2818-26, SPIE '96, Denver, Colo.). This technique assumes nearly complete spectral overlap between a panchromatic band and the multi-spectral bands it is used to sharpen. It also assumes a linear relationship between intensities in the pan and multi-spectral bands. The present technique requires neither of these assumptions.

The Pradines algorithm and the Price algorithm, referenced in the Lindgren and Kilston paper, each also are based on the linearity assumption, whereas the present technique can have different relationships for different spectral signatures.

SUMMARY OF THE INVENTION

According to one embodiment of the present invention, a method has been found that effectively and efficiently increases the apparent spatial resolution of a source image based on an auxiliary, co-registered image of a higher spatial resolution. In what follows, an image is a collection of pixels. A pixel is the smallest unit of spatial subdivision. Some elements smaller than one pixel cannot be distinguished. A pixel represents the total information collected by the image system sources. Each of the source and auxiliary images includes a plurality of pixels with corresponding spectral intensities. The method follows five steps: reducing, identifying, deriving, subdividing and modifying procedures.

In the reducing step, the spatial resolution of the auxiliary image is reduced to a common spatial resolution with that of the source image. Then in the identifying step, corresponding groups of pixels at the common resolution in the source and auxiliary images are identified. In the deriving step, a map is derived associating differences in the spectral intensities of adjacent pixels in the auxiliary image with differences in the spectral intensities of corresponding adjacent pixels in the source image.

In the subdividing step, each source pixel is subdivided according to the geometry of the associated auxiliary pixels. Then in the modifying step, the spectral intensity for each subdivided source pixel is computed using the map. The result is an apparent increased resolution of the source image.

The method does not use computationally demanding Gaussian or Laplacian pyramids as described in the article by Iverson and Lersch. For this reason, methods according to the present invention are faster than the Iverson and Lersch techniques at image sharpening.

BRIEF DESCRIPTION OF THE FIGURES

These and other objects, features and advantages of the invention will be more fully appreciated with reference to the detailed description and appended drawing figures.

DETAILED DESCRIPTION

Figure 1:
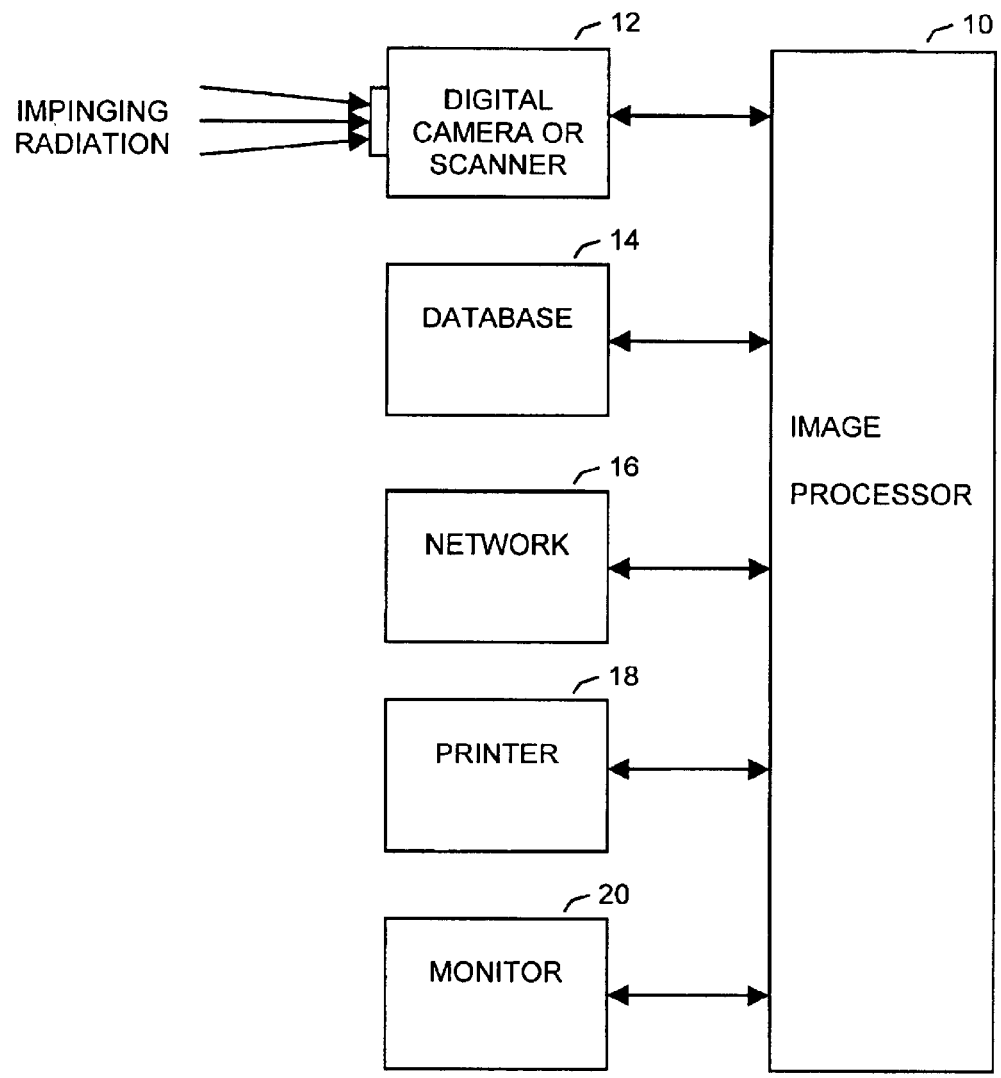
FIG. 1 depicts an image processor coupled to peripheral devices.

FIG. 1 depicts an image processor 10 in which the invention may illustratively find application. The image processor. 10 is coupled to a camera or scanner 12, a database 14, a network 16, a printer 18 and a monitor 20.

Typically the camera 12 is a digital system that is equipped with N filters for determining intensities at each of N frequencies or spectral bands of interest in a field of view. The camera 12 outputs N-dimensional pixel data. Each pixel specifies a spatial location within an image of the field of view and N spectral intensities associated with the location. As an alternative to a digital camera, film camera may be used to capture photographic images of the field of view. In this scenario, the camera 12 may be a scanner which scans N photographic negatives or prints and outputs N-dimensional pixel data of the scanned image. The camera 12 may be hand-held or mounted in a remote location, such as an airplane or a satellite.

Figure 2:
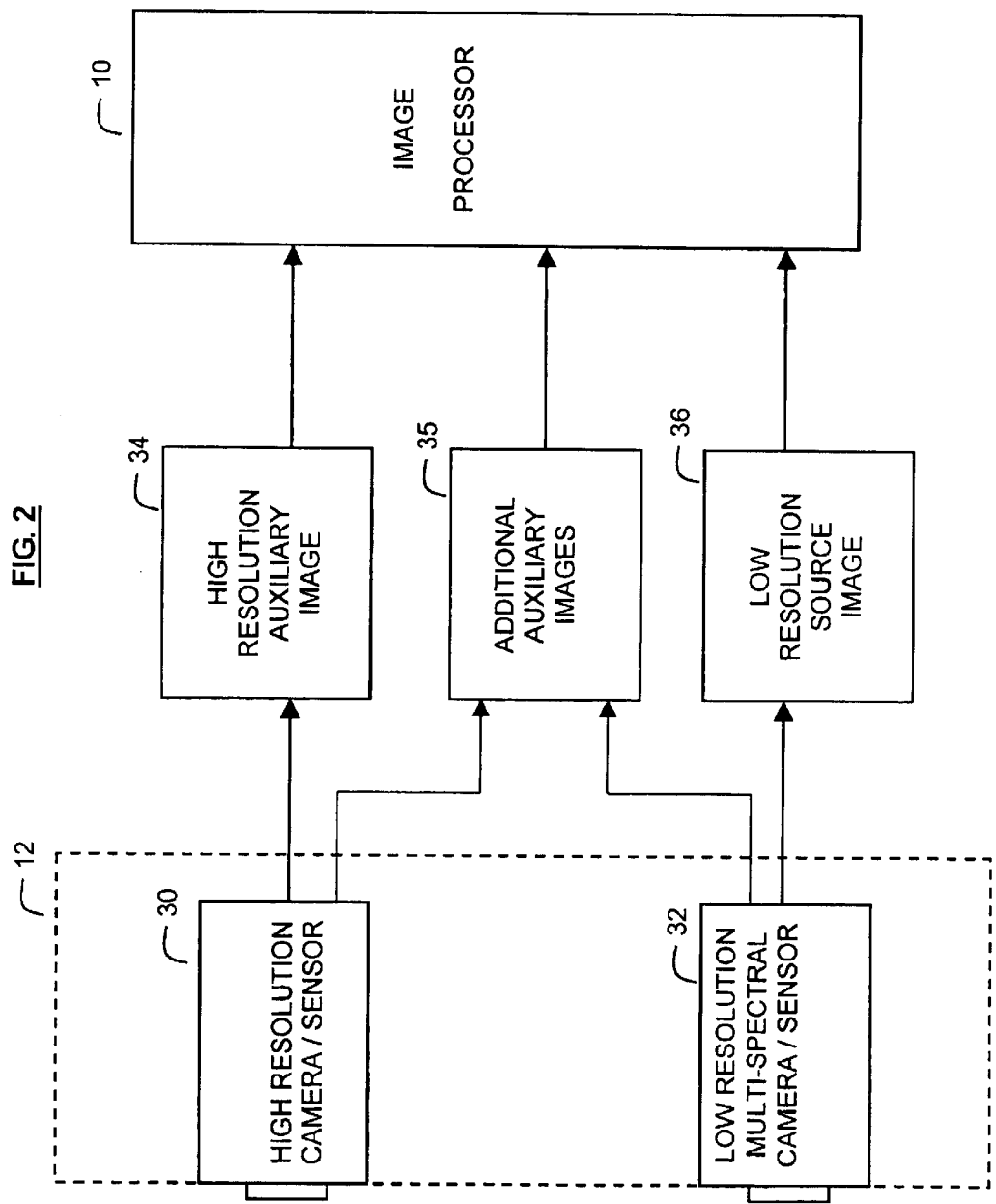
FIG. 2 depicts an internal view of a camera that provides source and auxiliary images to the image processor according to an embodiment of the present invention.

Internally, the camera 12 may include either multiple cameras or multiple sensors that are co-registered to capture impinging radiation from the field of view. For example, referring to FIG. 2, the camera 12 may include a high-resolution camera or sensor 30 and a low resolution, multi-spectral camera or sensor 32.

The high-resolution camera or sensor 30 may capture a single or multiple spectral bans. In on embodiment, the high resolution sensor 30 is a high-resolution panchromatic sensor, which outputs a single intensity that represents an aggregation of a wide range of spectral bands. Alternatively, a sensor which captures and outputs either a single or multiple narrow spectral band(s) may be used. Typically, the high-resolution camera or sensor configured to acquire all of the spectral bands of interest at the same, high resolution. The high resolution camera or sensor 30 outputs an N-dimensional auxiliary image 34 of the field of view to the image processor 10. For the auxiliary image 34, N is typically 1 and typically represents the panchromatic band. However, N may be greater than one and the spectral bands may be any convenient band or bands within or outside of the visible spectrum. Only one auxiliary band must have high resolution. The other auxiliary image bans can have any resolution equal to or better than that of the source image.

The low resolution camera or sensor 32 may be configured to capture multiple spectral bands of interest of a field of view that is co-registered with the high-resolution camera 30. The low resolution camera 32 outputs an N-dimensional, low resolution source image 36 of the field of view to the image processor 10. From a group of co-registered images of various resolutions, one is chosen as the "source image," i.e. the one to be enhanced, one is chosen as the primary auxiliary image and must have a higher spatial resolution than the source. Any or all of the images can be included as auxiliary images and will serve to improve a spectral discrimination for each pixel of the source. Preferably, the spatial resolution of the auxiliary image is an integer multiple greater than the source image in any and/or all dimensions.

The image processor 10 may receive imaging data in real time from the camera 12 and process the imaging data in real time for output to the monitor 20 or printer 18. Alternatively, the image processor 10 may output processed images to the database 14 or the network 16. The network 16 may illustratively include a local area or wide area network, a telecommunications network or the network of interconnected computers and computer networks known as the Internet. The image processor 10 may also receive imaging data, representing the source image 36, auxiliary image, 34, and, possibly additional auxiliary images 35, from the database 14 or the network 16 instead of the camera 12. The image processor then processes the imaging data and sends the resulting processed image to any of the output devices 14–20.

Figure 3A:
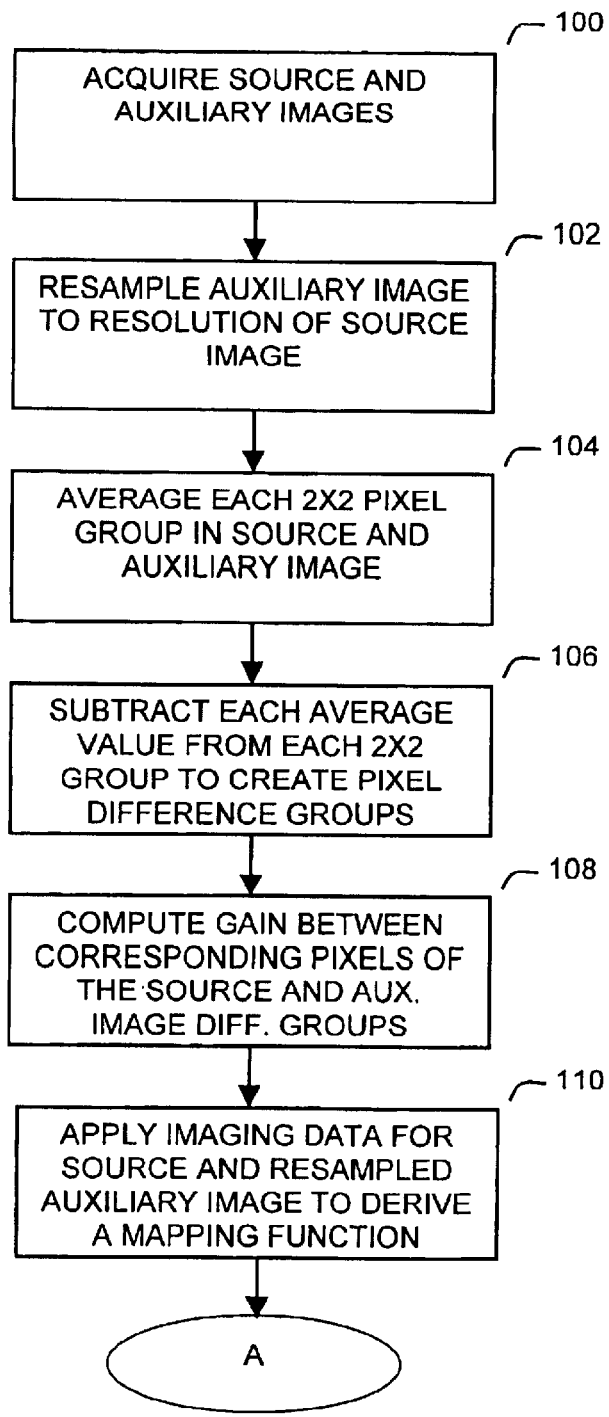
FIGS. 3A–3C depict a method of increasing the spatial resolution of the source image according to an embodiment of the present invention.
Figures 3B, 3C:
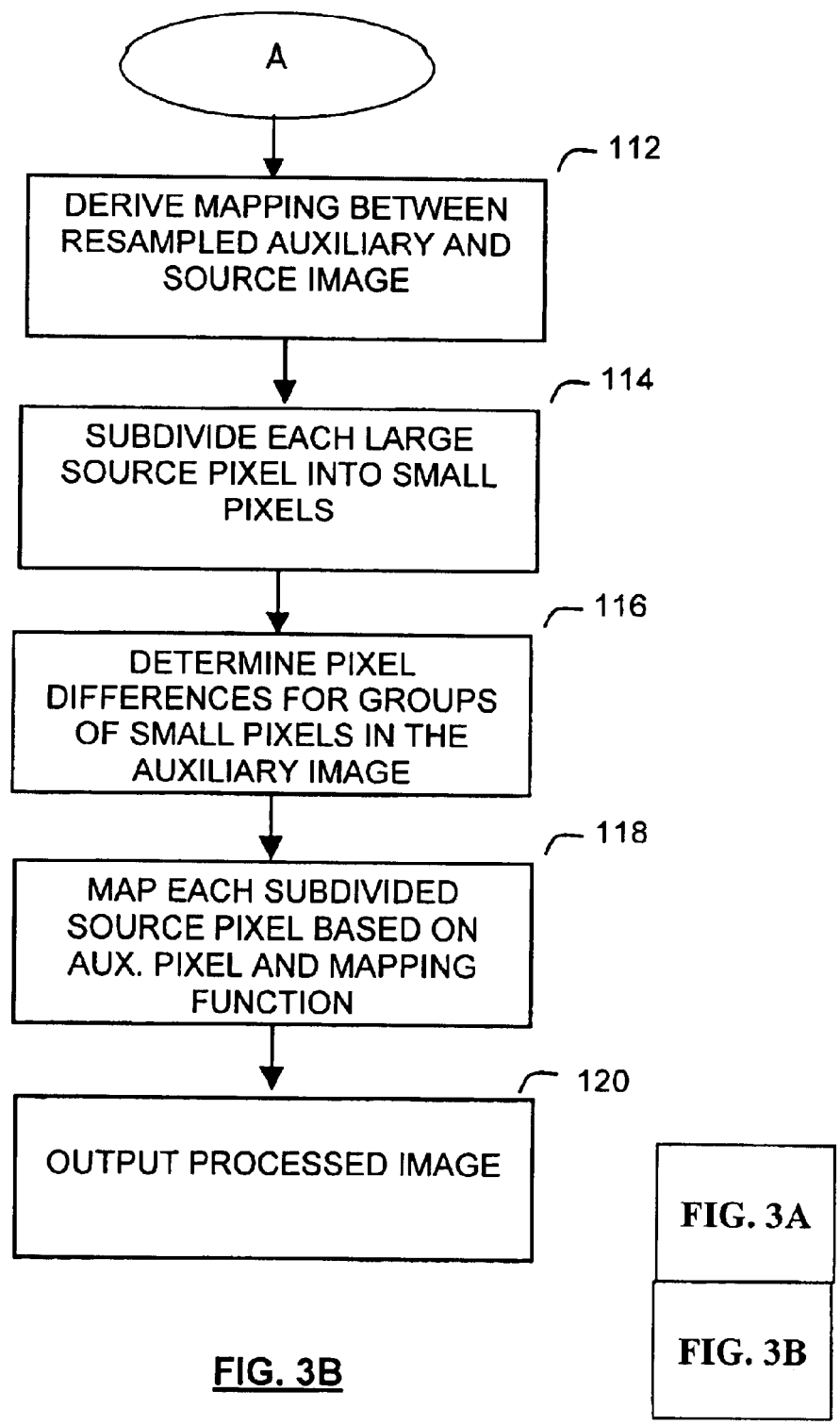

FIG. 3 depicts a method of increasing the spatial resolution of the source image 36 using the auxiliary image 34 according to an embodiment of the present invention. The method is not complex and does not use the computationally demanding Gaussian or Laplacian pyramids as described in the article by Iverson and Lersch. Because the computations are simple and relatively few, a method according to the present invention is much faster than the Iverson and Lersch techniques at image sharpening.

Figure 4:
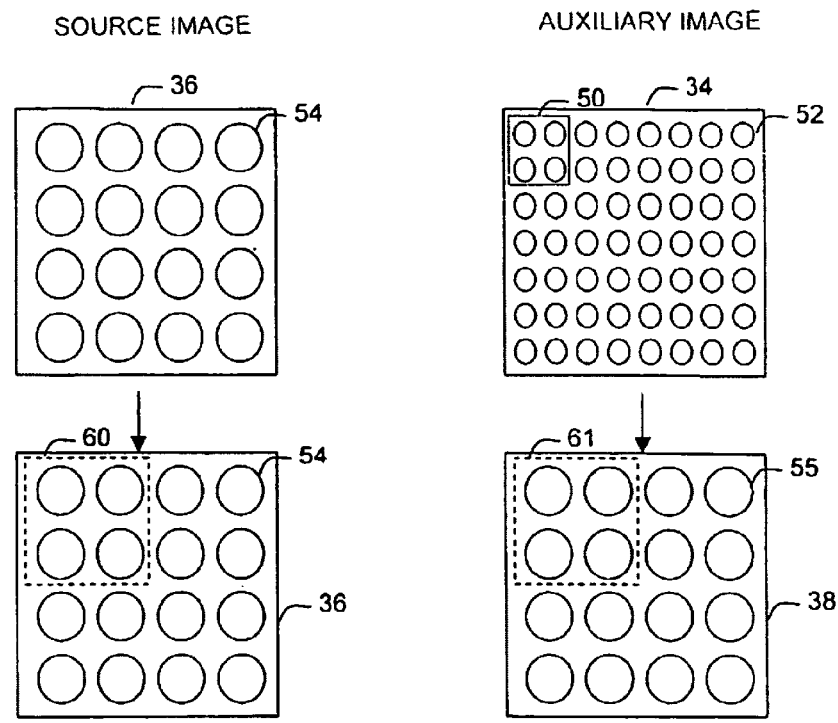
FIG. 4 depicts resampling an auxiliary image to common resolution with the source image.

First, the method will be described using a single auxiliary image. In step 100, the image processor 10 acquires the source image 36 and auxiliary image 34. The acquired source image 36 has a lower spatial resolution than the acquired auxiliary image 34. For this reason, the source image 36 has fewer, larger pixels than the auxiliary image 34 as shown in FIG. 4. Additional auxiliary images 35 may also be acquired but are not used in this illustration. The image processor 10 may acquire the images 34 and 36 from the camera 12, the database 14, or the network 16.

In step 102, the image processor 10 re-samples all of the high resolution pixels 52 of the auxiliary image 34 to have the same spatial resolution as the source image 36. This step is shown graphically in FIG. 4. In the simplest case, the auxiliary image 34 has a resolution that is an integer multiple of the source image 36 in any single dimension or in all dimensions. In this case, the image processor 10 defines clusters 50 within the high resolution pixels 52 based on the integer multiple of each linear dimension. For example, if the auxiliary image 34 has twice as many pixels in each linear dimension, then each group 50 will include a 2×2 array of high resolution pixels 52. Similarly, if the auxiliary image 34 has three times as many pixels in each linear dimension, then each group 50 will include a 3×3 array of high resolution pixels 52. For each group 50, the image processor 10 forms at least one average coarse pixel 55. The average coarse pixel(s) 55 for each group 50 is equal to the average of spectral intensities for the high resolution pixels 52 in each group 50. More sophisticated and accurate sub-sampling techniques known in the literature (see, for example, *Digital Image Processing*, W. K. Pratt, John Wiley & Sons, New York, 1978) could be used instead of simple averaging.

The set of coarse pixels 55 are then used as the resampled pixel values that comprise the re-sampled auxiliary image 38. The coarse pixels 54 in the source image 36 and the coarse pixels 55 in the auxiliary image 34 have the same spatial resolution after step 102. This is illustrated in the following examples.

EXAMPLE 1

Source Image: 200×200 pixels

Auxiliary Image: 400×400 pixels from panchromatic sensor

Multiple: (2× in each linear dimension)
Common Resolution: 200×200

To resample the 400×400 pixel auxiliary image, define groups 50 of pixels in the auxiliary image as 2×2 groups of high-resolution pixels 52. Take the average pixel intensity value of each group 50 and define a new, coarse pixel 55 representing each group in the re-sampled 200×200 pixel auxiliary image. There is no need to resample the source image because the re-sampled auxiliary image has been converted to the same spatial resolution as the source image.

EXAMPLE 2

Source Image: 300×300 pixels
Auxiliary Image: 800×800 pixels from panchromatic sensor
Multiple: (2.66× in each linear dimension)
Common Resolution: 300×300 pixels Because the spatial resolution of the auxiliary image is not an integer multiple of the spatial resolution of the source image, the auxiliary image is resampled twice. First, the auxiliary image 34 is resampled to an intermediate spatial resolution of 600×600 pixels. This resampling is done by converting each 1.33 pixels in the 800×800 pixel auxiliary image 34 to 1 pixel using pixel interpolation. Subsequently, the intermediate auxiliary image is resampled a second time by grouping high resolution pixels 52 in the auxiliary image into 2×2 groups 50. The average pixel intensity value of each 2×2 group 50 defines a new, coarse pixel 55 representing each group in the 300×300 pixel resampled auxiliary image 38. There is no need to resample the source image 36 because the resampled auxiliary image 38 is at the same spatial resolution as the source image 36.

Figure 5:
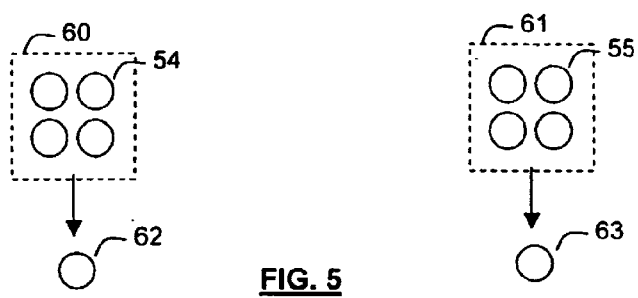
FIG. 5 depicts forming an average pixel for each group of pixels according to one embodiment of the present invention.
Figure 6:
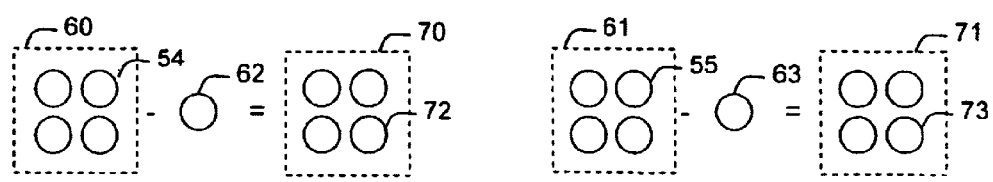
FIG. 6 depicts forming image difference groups according to one embodiment of the present invention.

In step 104, the image processor 10 identifies groups 60 of coarse pixels 54 within the source image 36 and groups 61 of coarse pixels 55 within the resampled auxiliary image 38. An average coarse pixel 62 is then determined for each group 60 of coarse pixels 54 within the source image 36 and the auxiliary image 34. This is shown in FIG. 5.

When the pixels in the auxiliary image have only one spectral intensity value corresponding to a single spectral band, then averaging is performed one time to determine one average coarse pixel for each group 60. When either the source image 36 or auxiliary image 34 has N spectral intensities corresponding to N spectral bands (as is most often the case with the source image 36), an average coarse pixel 62 is determined for each group of coarse pixels 60 at each spectral band. For example, in the case of a source image represented using red, green, and blue bands, an average coarse pixel for each of the red, green and blue intensities may be determined for each group 60 and 61.

In step 106, the image processor 10 subtracts the average coarse pixel 62 for each group 60 from each coarse pixel 54 in the same group, and also subtracts the average coarse pixel 63 for each group 61 from each coarse pixel 55 in the same group. The result is a new group called a pixel difference group 70 and 71. For example, given pixel intensities of 1, 2, 3 and 4 within a 2×2 group 60, the average coarse pixel 62 has an intensity of 2.5. Therefore, the pixel difference group 70 corresponding to the 2×2 group 60 includes the following pixel difference values: −1.5, −0.5, 0.5 and 1.5. Step 106 is performed on all groups 60 and 61 in the source image 36 and the resampled auxiliary image 38, respectively.

Figure 7:
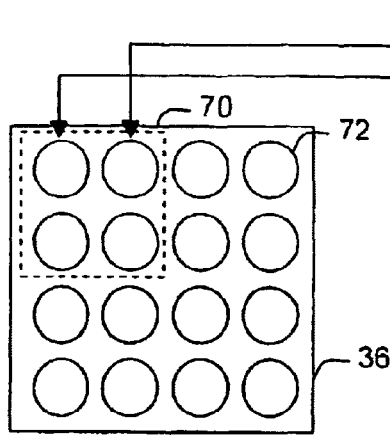
FIG. 7 depicts corresponding pixels between groups of a source and auxiliary image according to the present invention.
Figure 7:
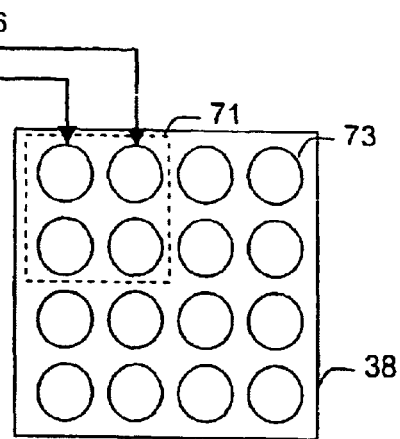
Figure 8:
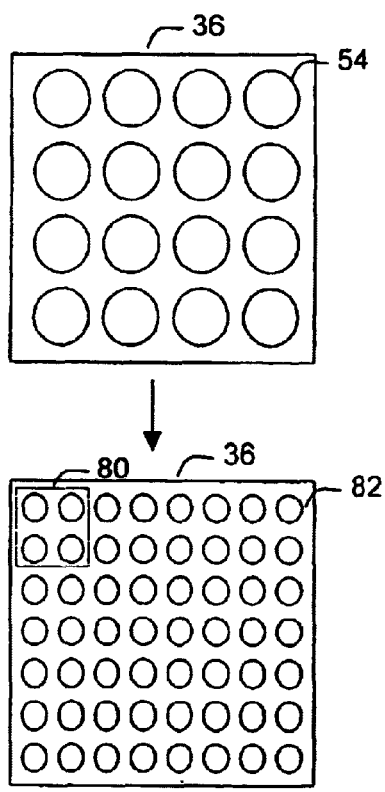
FIG. 8 depicts subdividing source pixels according to one embodiment of the present invention.
Figure 8:
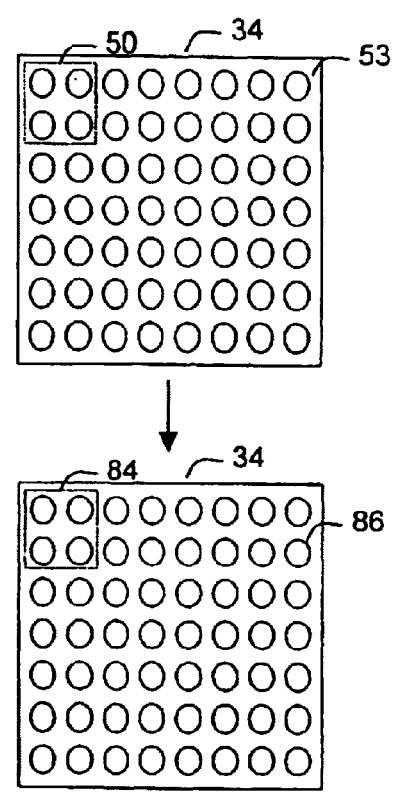
Figure 9:
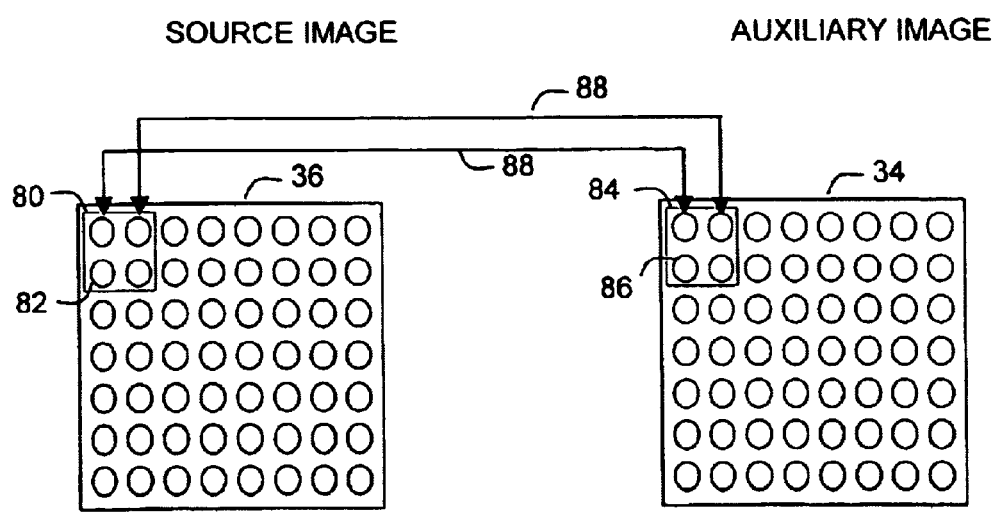
FIG. 9 depicts mapping pixel intensities from the auxiliary image to the subdivided pixels of the source image according to one embodiment of the present invention.

In step 108, the image processor 10 computes a gain between corresponding pixels in the pixel difference groups 70 of the source image 36 and groups 71 of the auxiliary image 38. This is graphically illustrated in FIG. 7 with lines 76 indicating corresponding and associated pixel groups.

When the auxiliary image includes multiple spectral bands, the image processor 10 computes the gain value as a function of the spectral signature represented by the plurality of pixel values represented by the image planes. The source pixel can be used as one component of the spectrum. Step 108 is repeated for every pixel difference group in the source image 36 and resampled auxiliary image 38.

The basic assumption of the technique is that the ratio of small changes in the higher resolution auxiliary image to changes in the source image calculated at lower resolution, will be characteristic for the imaged material represented in a pixel. The assumption is that this ratio will still be correct for high spatial frequencies beyond the cutoff of the sensor for the source pixels. Thus it is desired to compute a mapping of the characteristics of the reflecting material to the ratio of small changes in the auxiliary image to small changes in the source image. It is expected that the ratio will be different for different materials. If many auxiliary bands are present, the material can be identified by its spectral signature. If only one auxiliary band is present, then the material must be identified (less reliably) by only the two large pixels available.

In step 110, imaging data for the source image 36 and resampled auxiliary image 38 acquired and calculated in steps 100–108 are stored in the database 14 for application to a mapping function. The mapping function determines relationships between co-located pixels from the source image 36 and the resampled auxiliary image 38. The imaging data applied to the mapping function may be any of the following: intensities of pixels 54 of the source image 36 or pixels 53, resampled auxiliary image 38, gain values determined in step 108; difference values determined in step 106, or average pixel intensities determined in step 104.

The imaging data in step 110 is generally comprised of an array of pixels, where each pixel represents a position on a source image 36 or an auxiliary image 34 and a spectral profile of the position. The spectral profile is represented by an N-dimensional vector having N spectral intensities. For many application, N is 3 and each of the three spectral intensities represents a respective intensity in the visible light portion of the spectrum, such as red, green or blue color. Combinations of varying red, green and blue intensities may be perceived as a large range of colors in the visible spectrum. For other applications, N may be greater or less than 3 and the respective spectral intensities may be measured within and outside of the visible portion of the electromagnetic spectrum. For example, in the case of the TMS and MAMS imaging sensors, N is 11 and includes frequencies in the infra-red portion of the electromagnetic spectrum. In the case of AVIRIS imaging data, N is 224 and includes a wide range of frequencies. AVIRIS and similar sensor data may include sufficient spectral information on the materials represented in the image to allow classification of the materials.

The auxiliary image 34, like the source image 36, may also have N-dimensional pixel data where N may be 1, 3, 11, 224 or any other convenient number. However, at least one band of the auxiliary image 34 must have higher resolution than the source image to permit spectral sharpening according to the present invention.

For any given co-located pixel in the source image 36 and the auxiliary image 34, an intensity vector describes the spectral content of the material represented by the pixel. The intensity vector, therefore, includes spectral intensities for the source image and the auxiliary image and has a dimensionality that is the sum of the number of spectral bands in the source and auxiliary images. The intensity vector may permit identification of the material represented by the pixel and at a minimum identifies materials with similar imaged characteristics. The average source and auxiliary image pixels calculated in step 104 may be used for the intensity vector.

Also, for any given co-located pixel in the source image 36 and the auxiliary image 34, a gain vector describes the relationship between differential changes in pixel intensities of the auxiliary image to differential changes in pixel intensities of the source image. The gain which is determined based on steps 106 and 108 as described, is typically a ratio of differential source pixel intensity to differential auxiliary image pixel intensity. For each pixel, one ratio is typically formed for each spectral band in the source image as a ratio to each spectral band in the auxiliary image 34 that has a higher spatial resolution than the source image. Each gain is generally only valid for pixels that have imaged vectors that are close to the imaged vector of the underlying pixels in the source image 36 and auxiliary image 34 for which the gain was calculated.

In step 112, a mapping function is derived and stored in the database 14. In general, if the intensity vector has many components representing multispectral data, the mapping function cannot be a simple table lookup because the table could be impracticably large with sparse data. What is desired is a table lookup which interpolates measured gains in the vicinity of the intensity vector. The mapping function is amenable to several neural network implementations, including: a general regression neural network (GRNN); a probabilistic neural network (PNN); Multi-Layer Perceptron (MLP) or K Nearest Neighbors (KNN). GRNN or MLP or KNN estimate the differential gains directly. PNN classifies patterns into one of several categories. The category information, in turn, is used to indicate the amount of change necessary for a given small pixel relative to a corresponding large pixel. Alternatively, the category information could indicate the local gain relating the differential change in the auxiliary image to that for the source image. The neural networks may be implemented in hardware, software or a hybrid of hardware and software. Vector quantization, fuzzy logic, genetic algorithms, applied statistics and other neural networks may also be used for the mapping function. Further discussion of certain neural network and other embodiments follows.

After deriving the mapping in step 112, the higher-resolution source image is created as illustrated in steps 114–120. To facilitate explanation of the method, a "large pixel" is defined as the smallest pixel of the original source image and as a pixel of the same size in the principal auxiliary image, which typically must be calculated by averaging even smaller pixels present in the principal auxiliary image. Pixels 55 of the re-sampled auxiliary image 38 are large pixels. A "small pixel" is defined as the desired pixel size for the enhanced source image. In the example discussion, there are four small pixels that cover the same area as one large pixel, but different mappings, or numbers of small pixels such as five, nine, sixteen or any other convenient number, may be used. The only requirements are that the small pixels of the principal auxiliary image match the small pixels of the enhanced source and that an integral number of small pixels are covered by one large pixel. In step 114, each large pixel of the source image 36 is subdivided into small pixels (typically a 2×2 array).

In step 116, for each small pixel of the corresponding large pixel of the principal auxiliary image, compute the difference between it and the large pixel intensity (which is the average of all of the small pixels it covers). Then, in step 118, for each small pixel, the processor 10 retrieves from the mapping in the database a stored intensity vector to which the intensity vector of the corresponding large pixel in the source and the auxiliary image is the closest. In step 120, the processor 10 computes new small pixel intensities for each color or spectral band of the enhanced source image as the intensity of the large source pixel+(the associated gain) times (the difference between the small pixel and large pixel of the principal auxiliary image).

After all of the large pixels 54 of the source image 36 have been mapped to new small pixels 82 based on the pixel differences of the auxiliary image and the gain values, the new pixels 82 are output in step 120 as the processed image. The processed, source image has a higher resolution than the original source image.

To illustrate a specific embodiment of the method of the present invention, the following conditions are assumed. The imaging data applied to the mapping function in step 110 are the intensities of the average pixels determined in step 104 for the source image 36 and the auxiliary image 34 and the gains between pairs 76 of corresponding pixels of the source and resampled auxiliary image difference clusters 70. The pixels of the source image 36 are three-dimensional, having red, green and blue intensities. The pixels of the auxiliary image 34 and resampled auxiliary image 38 are one-dimensional, having a single panchromatic intensity.

A. Vector Quantization

Step 112 may be performed using a clustering technique, such as vector quantization. Suppose for example that a three-color image and a co-registered panchromatic image are available. Each of the three color planes are to be enhanced, one at a time. One is chosen as the source, the panchromatic image is the principal auxiliary image, and all three color planes are used as additional auxiliary images. According to this embodiment, the image processor 10 assembles a codebook relating gain to imaged object as identified by spectral signature. First a conditional gain must be calculated for each average pixel determined in step 104 for each color in the source image 36. To accomplish this, four conditional gains are first calculated in steps 106 and 108 based on the 2×2 matrix of small pixels that correspond to the average pixel as follows:

gain_1=(upper left corner small pixel (source–average pixel (source))/(upper left corner small pixel (principal Auxiliary–average pixel (princ. Aux.)).

Similarly gain_2, gain_3, and gain_4 are calculated for the other 3 corners. The four conditional gains can be combined into one gain relating the average source pixel to the average pixel of the principal auxiliary image for each color of the source image. The one gain may be determined by any convenient method, including taking the median or the average of the four conditional gains, with a provision for handling infinite gains resulting from zero denominators. For example, unless all four small-pixel conditional gains are infinite, the infinite ones may simply be ignored when finding the median or mean of the remaining ones. If all four are infinite, the average pixel gain may be set arbitrarily to zero or the pixel may be ignored for codebook formation purposes.

After calculating gains for each average pixel and each color of the source image as describe above, each average pixel can now be represented as a four-dimensional intensity vector and a three dimensional gain vector. The four-dimensional intensity vector includes four values corresponding to the intensity of the red, green, blue, and panchromatic bands of each average pixel determined in step

104. In general, the intensity vectors represent the imaged characteristics of objects or materials appearing in a sensor field of view and may be expected to be substantially uniform for each type of object or material. The three-dimensional gain vector includes three gains relating differential changes in the principal auxiliary image panchromatic pixel to differential changes in each color of the source image calculated as explained above.

Since there are typically a large number of average pixels in an image, some form of clustering is required to represent the characteristics of the imaged materials present in the images in a reduced set of intensity vectors. A simple method of vector quantization is the following: Take the first four-dimensional intensity vector as a cluster center and store it in the first position of the codebook. At each position in the codebook also store, for example, the gain vector and the number of pixels (np) represented by this cluster center. For every other pixel, compare its four-dimensional intensity vector with every stored intensity vector in the codebook. If it is close to one of the stored intensity vectors, average its gain vector with the gain vector of the stored vector weighing the previously stored gain vector by np, and incrementing np by 1. If it is close to one of the stored intensity vectors, average its gain vector with the gain vector of the stored vector weighing the previously stored gain vector by np, and incrementing np by 1. If it is not close, store the intensity vector and its associated gain vector as a new entry in the codebook. To determine whether or not the intensity vectors are close, a distance measure needs to be selected and a threshold set. Typical distance measures are Euclidean, sum of absolute differences of the component of the intensity vector, and maximum of the absolute differences of the components of the intensity vector.

After the codebook is filed in this manner, there will typically be many cluster centers for which the associated np is small. These usually represent noise pixels. Therefore, all entries for which np is less than some second threshold should be eliminated.

Rendering of the higher-resolution source image is accomplished as follows: Define "large pixel" as the smallest pixel of the original source image and a pixel of the same size in the principal auxiliary image, which typically must be calculated by averaging smaller pixels present in the principal auxiliary image. Define "small pixel" as the desired pixel size of the enhanced source image. Typically, there are four small pixels covering the same area as one large pixel, but different mappings are possible. The only requirements are that the small pixels of the principal auxiliary image match the small pixels of the enhanced source and that an integral number of small pixels are covered by one large pixel. In step 114, each large pixel of the source image 36 is subdivided into small pixels (typically a 2×2 array). In step 116, for each small pixel of the corresponding large pixel of the principal auxiliary image, compute the differences between it and the large pixel intensity (which is the average of all of the small pixels it covers). Then, in step 118, for each small pixel, retrieve from the codebook an entry having a four-dimensional intensity vector to which the corresponding large pixel's four-dimensional intensity vector is the closest. In step 120, the processor computes the small pixel intensity of the enhanced source image as the intensity of the large source pixel+(the associated gain) times (the difference between the small pixel and large pixel of the principal auxiliary image) for each color.

B. Other Clustering Techniques

Many other clustering techniques besides vector quantization are known in the literature. Any of these can be used to find prototypes with associated gain. However obtained, these prototypes can be used for rendering a final image in the same way.

C. K Nearest Neighbor (KNN)

Assuming that the clustering was accomplished as in A or B above, the associated gain vector used in rendering each small pixel of the enhanced source image could be the average of the K most-similar codebook entries.

D. General Regression Neural Network (GRNN)

Assuming that the clustering was accomplished as in A or B above, the associated gain used in rendering each small pixel could be determined using a GRNN neural network wherein the center of each node is a cluster center of the codebook, and each node is weighted by its associated np value. In this case, the gain used for rendering is a weighted average of all the associated gains in the codebook. The weighting for each gain is the associated np times exp $(-distance^2/sigma^2)$. Alternatively, the weighting for each gain could be the associated np times exp (the distance/sigma).

E. Probabilistic Neural Network (PNN)

Assuming that the clustering was accomplished as in A or B above, the associated gain vector used in rendering each small pixel could be determined using a PNN neural network wherein the center of each node is a cluster center of the codebook, and each node is weighted by its associated np value. In rendering, the category would be determined by PNN classification of the auxiliary vector (4 dimensional intensity vector in the example) and the gain vector used would be the center of the range used to define the category.

F. Multi-Layer Perceptron (MLP)

In this case clustering is not necessary as a preprocessing step, but could be used. Input to the MLP would be a series of vectors representing each large pixel. Each vector would be, as in A, composed of the intensity values of that pixel for each of the co-registered image planes available, with an associated target gain as computed in A. In rendering each small pixel, the large pixel intensity vector is input to the MLP. Its output is the gain vector which should be applied to the small pixel differences.

G. Other Regression Techniques

The MLP forms a non-linear regression of gain relative to the input vector. Any other regression technique could be used in the same way. Suitable techniques include the Group Method of Data Handling (GMDH), and radial basis function estimation (RBF).

While simple conditions were assumed above for illustrative purposes, each neural network may be significantly more complex than described above and may include more inputs than described above.

After all of the pixels 82 of the source image 36 have been mapped to new values based on the pixel differences of the auxiliary image and the gain values, the new pixels 82 are output in step 120 as the processed image. The processed, source image has a higher resolution than the original source image.

Although specific embodiments of the present invention have been described, it will be understood by those having ordinary skill in the art that changes may be made to those embodiments without departing from the spirit and scope of the invention.

What is claimed is:

1. A method of increasing the sharpness of a source image based on at least one auxiliary, co-registered image(s) of a higher degree of sharpness, wherein one or more auxiliary images of a field of view and the source image of the field of view comprise a plurality of pixels with corresponding spectral intensities, and wherein the spectral intensities of co-located pixels in the source and one or more auxiliary images define an intensity vector for each co-located pixel, comprising:

resampling the source and the auxiliary images to a common, lower resolution;

determining for each source image pixel a gain relating a differential change in intensity in the source image pixel with a differential change in intensity of a corresponding auxiliary image pixel, based on the common, lower resolution, wherein determining the gain includes dividing the pixels in the source image and auxiliary image into corresponding pixel groups each having a plurality of pixels, calculating an average value for each pixel group in the source image and for each corresponding pixel group in the auxiliary image, subtracting the average value from each pixel group to create pixel difference groups, and computing the gain between corresponding pixels of each pixel difference group of the source image and the corresponding pixel difference group of the auxiliary image;

deriving a mapping function correlating determined gains with corresponding intensity vectors;

subdividing each pixel of the original source image into a plurality of small pixels, each small pixel of the original source image corresponding in size and location to a small pixel in the auxiliary image; and modifying the intensity of each subdivided source pixel based on differences in intensities between the small and large pixels in the auxiliary image and an interpolated gain from the mapping function.

2. The method of claim 1, wherein each of the large source pixels is subdivided into N×M pixels in the subdividing step.

3. The method according to claim 2, wherein N is equal to M.

4. The method according to claim 2, wherein N is not equal to M.

5. The method according to claim 1, wherein the intensity vector includes at least two spectral intensities for each pixel.

6. The method according to claim 1, wherein the deriving step includes creating a codebook relating intensity vectors to at least one corresponding gain value based on the determining step.

7. The method according to claim 6, wherein the creating is performed according to vector quantization.

8. The method according to claim 6, wherein the modifying is performed according to a weighted average of the gain value for each intensity vector in the codebook.

9. The method according to claim 6, wherein the modifying is performed using a general regression neural network having node centers based on the intensity vectors in the codebook.

10. The method according to claim 6, wherein the modifying is performed using a probabilistic neural network having node centers based on the intensity vectors in the codebook.

11. The method according to claim 1, wherein the determining, deriving, subdividing and modifying steps are performed based on a plurality of co-located auxiliary images.

12. The method according to claim 1, wherein each pixel group comprises N×N pixels.

13. The method according to claim 12, wherein N is two.

14. The method according to claim 1, wherein the gain relating a differential change in intensity in the source image pixel with a differential change in intensity of a corresponding auxiliary image pixel is computed as a function of the spectral signature of the material being imaged, based on a number of auxiliary images.

15. The method according to claim 14, wherein the number of auxiliary images is one.

* * * * *